United States Patent
Chakra et al.

(10) Patent No.: US 10,031,901 B2
(45) Date of Patent: Jul. 24, 2018

(54) NARRATIVE GENERATION USING PATTERN RECOGNITION

(71) Applicant: International Business Machines Corporation, Armonk, NY (US)

(72) Inventors: Al Chakra, Apex, NC (US); Jonathan Dunne, Dungarvan (IE); Liam Harpur, Skerries (IE); Eduardo A. Patrocinio, Apex, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 31 days.

(21) Appl. No.: 15/085,226

(22) Filed: Mar. 30, 2016

(65) Prior Publication Data

US 2017/0286377 A1   Oct. 5, 2017

(51) Int. Cl.
*G06F 17/24* (2006.01)
*G06F 17/30* (2006.01)
*G06F 17/28* (2006.01)

(52) U.S. Cl.
CPC .............. *G06F 17/24* (2013.01); *G06F 17/28* (2013.01); *G06F 17/30719* (2013.01)

(58) Field of Classification Search
CPC .............. G06F 17/30719; G06F 17/30; G06F 17/30011; G06F 17/30374; G06F 17/30377
See application file for complete search history.

(56) References Cited

U.S. PATENT DOCUMENTS

| | | | |
|---|---|---|---|
| 8,150,930 | B2 | 4/2012 | Satterfield et al. |
| 8,825,888 | B2 | 9/2014 | Schoen et al. |
| 8,996,627 | B1 | 3/2015 | Urano et al. |
| 2016/0171588 | A1* | 6/2016 | Linden ................ G06F 3/0488 705/26.7 |
| 2016/0179964 | A1* | 6/2016 | Lin .................... G06F 17/3089 707/734 |
| 2017/0245023 | A1* | 8/2017 | Brelis ................ H04N 21/8541 |
| 2017/0309194 | A1* | 10/2017 | Simske ............... G06N 99/005 |

* cited by examiner

*Primary Examiner* — Ariel Mercado Vargas
(74) *Attorney, Agent, or Firm* — Cantor Colburn LLP (57) ABSTRACT

Methods, systems and computer program products for narrative generation using pattern recognition by topic are provided. A method includes identifying a topic from content. The method includes obtaining events associated with the topic from one or more sources. The method includes processing the events. The method includes generating a narrative of the topic using pattern recognition on the events. The method includes transmitting the narrative for presentation to a user.

14 Claims, 3 Drawing Sheets

NARRATIVE GENERATION USING PATTERN RECOGNITION

BACKGROUND

The present disclosure relates to data processing, and more specifically, to methods, systems and computer program products for narrative generation using pattern recognition by topic.

An activity stream is a list of recent activities performed by an individual, typically on a single website, application, or the like. For example, a social network may have a newsfeed that is an activity stream. Many different types of websites and applications have adopted the use of activity streams, but the format does not have a standardization and messages in the activity stream are often disorganized and may be difficult to follow due to a lack of persistence of the messages or a lack of correlation of messages within a stream or even between activity streams that may be directed to the same or similar topics.

SUMMARY

In accordance with an embodiment, a method for narrative generation using pattern recognition by topic is provided. The method may include identifying a topic from content; obtaining events associated with the topic from one or more sources; processing the events; generating a narrative of the topic using pattern recognition on the events; and transmitting the narrative for presentation to a user.

In another embodiment, a computer program product may comprise a non-transitory storage medium readable by a processing circuit and storing instructions for execution by the processing circuit for performing a method that may include identifying a topic from content; obtaining events associated with the topic from one or more sources; processing the events; generating a narrative of the topic using pattern recognition on the events; and transmitting the narrative for presentation to a user.

In another embodiment, a system for optimizing persistency using hybrid memory may include a processor in communication with one or more types of memory. The processor may be configured to identify a topic from content; obtain events associated with the topic from one or more sources; process the events; generate a narrative of the topic using pattern recognition on the events; and transmit the narrative for presentation to a user.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for narrative generation using pattern recognition by topic are provided. The methods and systems described herein are directed to organizing content associated with an identified topic in a logical manner and presenting only the relevant information in a narrative of the topic. A topic may be identified from a message of an activity stream (e.g., email, blog post, newsfeed, etc.). A narrative may be generated posted in the activity stream until a user has consumed the narrative (e.g., read the narrative, clicked on the narrative, or the like), at which point the narrative may be removed and the original content may be presented to the user. Thus, a narrative would be a temporary presentation of aggregated content that has been analyzed and generated using content from different sources. The narrative would be presented to the user until it is consumed. Once consumed, the system may revert back to the original content that was presented to the user.

In some embodiments, a topic may be identified from content (e.g., messages, blog posts, wiki entries, newsfeed events, etc.) that is determined to be interrelated with other content based on derived patterns of the content. The derived patterns may be used to identify content that should be aggregated to generate a narrative. The content may be analyzed to eliminate any redundant data and to identify best present the narrative (e.g., reorganizing content blocks to ensure accurate chronology). The narrative may be presented with the narrative, which has been streamlined and processed to provide context for the different content assembled in the narrative. For example, if there is duplication in the narrative activity stream, then it is removed from the stream to eliminate presentation of duplicated content. Additionally, content from different sources (e.g., messages, blogs, articles, etc.) may be merged to reduce the number of discrete messages displayed to a user that has the exact same information.

In some embodiments, the derived patterns may be defined (e.g., via statistical or qualitative analysis) from the perspective of the user, an author of a piece of content, or at a generic level.

The patterns may be defined (through statistical or qualitative analysis) from the perspective of the consumer or the author or at a generic level. In some embodiments, to generate the initial master patterns, the system may be guided (e.g., via statistical use or qualitative information) to obtain content from specific sources (e.g., a user may specify specific websites, newsfeeds, or the like). Through analysis of the specified sources, patterns may be derived, for example, to identify additional similar sources, or to obtain different types of content from the different sources. In another example, analysis of e-mails (e.g., analyzing 20,000 emails between support managers) in a support center may generate a pattern to organize individual posts in an activity stream to have a specific pattern, such as:

Multiple_Post_Level:Topic="Customer Responsiveness"
    Multiple_Post_Level:<Background>
    Multiple_Post_Level:<Customer_complaint1>
    Multiple_Post_Level:<Customer_complaint2>
    Multiple_Post_Level:<Customer_complaint3>
    Multiple_Post_Level:<Action1>
    Multiple_Post_Level:<Action2>
    Multiple_Post_Level:<Action3>

The above results in the activity stream only showing the posts that match the above pattern. Below is a sample pattern to temporarily modify an individual post (e.g., to be displayed in an activity stream as part of a larger pattern):

Post_Level:<Background>
    Post_Level:<Reference from reuters.com>
    Post_Level:<Reference from trusted_colleague>

The above results in the post only showing content that matches the above pattern. When a user is drafting content, or before the content is to be consumed, the system scans for other content (that is potentially viewable by the consumer) on the same topic in the activity stream (past, current, and future posts). The system may use various inputs to determine content correlation, such as:

Article/Message/thread title
Topic recipients
Relationship between recipients
Overall message content If the system determines that there are more discrete articles in the queue that are related to the topic, the system may consolidate the received messages so that the end user sees a coherent "narrative" (according to the pattern). This system may leverage text analytics and taxonomies to group messages together using various inputs, such as time that the content was created/sent/received/shared and commonalities between the topics.

The system may monitor data sources (e.g. social network feeds, e-mail and messaging repositories) to determine the patterns or combinations of topics that have been used before. If a threshold match is found, then the user or author of content is offered the option to recombine the content according to the pattern found. The author of the content can review the draft content, for possible further customization, before sending. This system may incorporate manual suggestions for topic combination as well as an automated system to determine the grouping/organization of topics.

An example of automatic content grouping/organization/editing includes when users create a large amount of content back and forth between each other. When a first user sees the plethora of content, this system may offer to group/organize/editing into a pattern.

A user or author of content may manually or automatically invoke the system provided pattern that matches the content (e.g., from the author or user perspective). For example, a user may manually tell the system that they want pattern Y to apply to topic 1. Or, a user can set preferences to apply a pattern under certain conditions, such as a period of time.

The system can then inject the allowable content from the list of available topics according to the above, derived and aggregated, pattern. Then the user can optionally review the message before sending.

Figure 1:
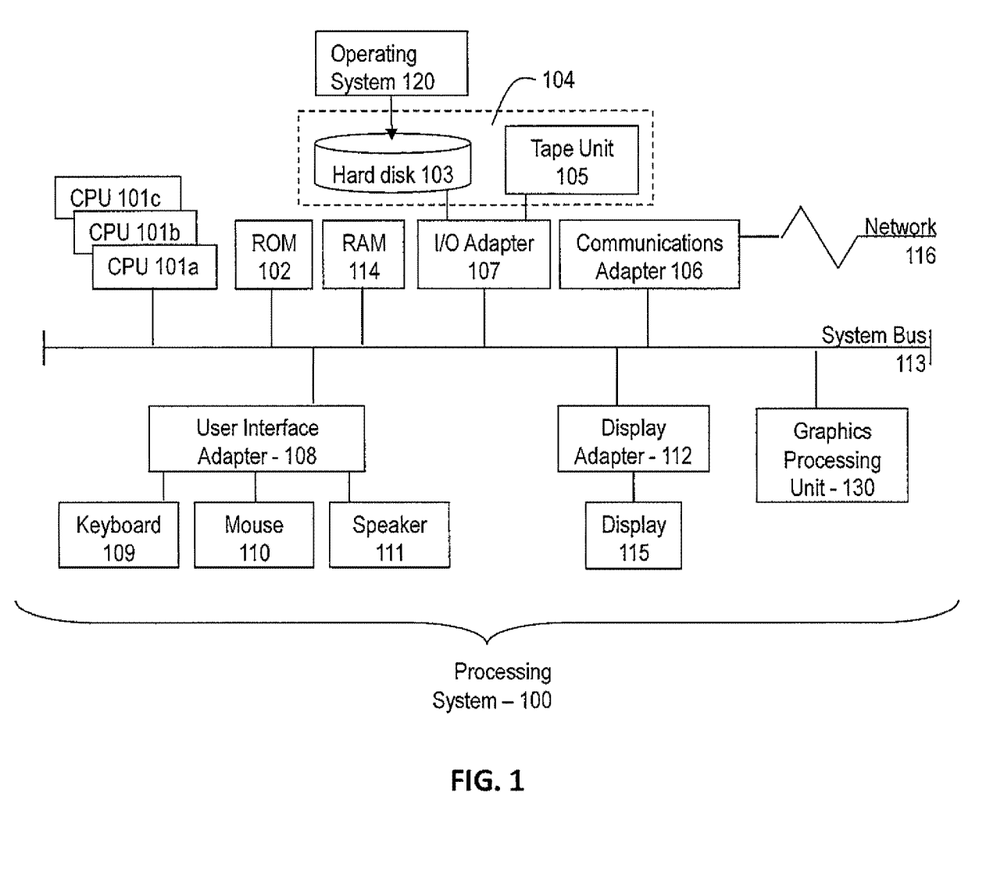
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
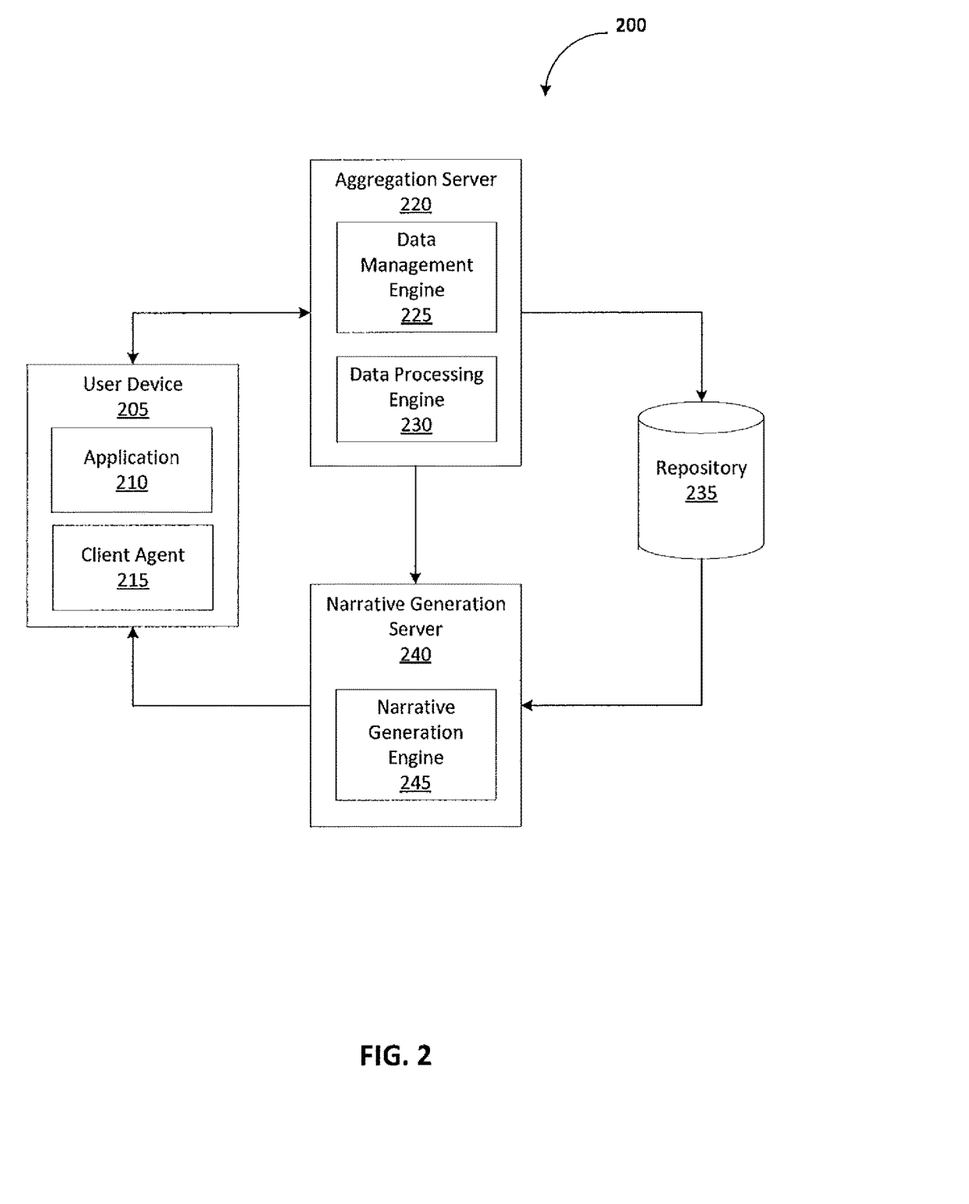
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a user device 205, an aggregation server 220, a repository 235, and a narrative generation server 240. The user device 205 may include one or more applications 210 and a client agent 215. An aggregation server 220 may include a data management module 225 and a data processing module 230. A narrative generation server 240 may include a narrative generation engine 245.

In some embodiments, the user device 205 may be any type of user device, which may include smartphones, tablets, laptops, desktop, server, and the like. A user device 205 may include one or more applications 210 and a client agent 215.

The one or more applications 210 may include computer-readable instructions that in response to execution by the processor(s) 101 cause operations to be performed including specific functionality associated with the application 210. The applications 210 may also provide content (e.g., messages, articles, posts, etc.) that may have been authored by the user or other individuals and may present them to a user of the user device 205.

The client agent 215 may include computer-readable instructions that in response to execution by the processor(s) 101 cause operations to be performed including presenting an interface to a user and receiving information from a user. The client agent 205 may receive an indication from a user to process a content item to generate a narrative. In some embodiments, the client agent 205 may be used to specify one or more parameters associated with the narrative, (e.g., time threshold to be associated with content to be displayed in the narrative, sources for the content of the narrative, personal preferences, etc.). The client agent 215 may communicate with an aggregation server 220 to facilitate generation of a narrative as requested by a user.

In some embodiments, the system may include an aggregation server 220. In some embodiments, the aggregation server 220 may be any type of computing device, which may include a laptop, desktop, server, and the like. An aggregation server 220 may include a data management engine 225 and a data processing engine 230. The data management engine 225 may include computer-readable instructions that in response to execution by the processor(s) 101 cause operations to be performed including communicating with a user device 205. The data management engine 225 may receive a request from the client agent 215 requesting a narrative. In some embodiments, the data management engine 225 may determine a user associated with the request and may obtain a user profile associated with the user. The data management engine 225 may use data form the user profile (e.g., user preferences, user specified parameters, user behavior history, etc.) to identify one or more sources to be used to obtain content associated with the requested narrative. The data management engine 225 may determine a topic associated with the request (e.g., based on the content item identified by the client agent 215 or the like) and may aggregate content from different sources. The data management engine 225 may transmit the aggregated content to the data processing engine 230.

The data processing engine 230 may include computer-readable instructions that in response to execution by the processor(s) 101 cause operations to be performed including receiving content from the data management engine 225. The data processing engine 230 may analyze and process the aggregated content. In some embodiments, the data processing engine 230 may identify and remove any redundant content (e.g., removing content obtained from a less trusted source, where the trust may be indicated by a value associated with the source and calculated based on different factors, such as the type of content, author of the content, type of source, or the like). In some embodiments, the data processing engine 230 may analyze the aggregated data to determine whether content is interrelated based on identified factors (e.g., target audience, type of data, type of content, etc.) and may group content based on the factors. In some embodiments, the data processing engine 230 may further analyze the content to identify any patterns from the content. The derived patterns may be used to identify content that should be aggregated to generate a narrative. The content may be analyzed to eliminate any redundant data and to identify best present the narrative (e.g., reorganizing content blocks to ensure accurate chronology). The narrative may be presented with the narrative, which has been streamlined and processed to provide context for the different content assembled in the narrative. For example, if there is duplication in the narrative activity stream, then it is removed from the stream to eliminate presentation of duplicated content. Additionally, content from different sources (e.g., messages, blogs, articles, etc.) may be merged to reduce the number of discrete messages displayed to a user that has the exact same information. In some embodiments, the derived patterns may be defined (e.g., via statistical or qualitative analysis) from the perspective of the user, an author of a piece of content, or at a generic level.

The patterns may be defined (through statistical or qualitative analysis) from the perspective of the consumer or the author or at a generic level. In some embodiments, to generate the initial master patterns, the system may be guided (e.g., via statistical use or qualitative information) to obtain content from specific sources (e.g., a user may specify specific websites, newsfeeds, or the like). Through analysis of the specified sources, patterns may be derived, for example, to identify additional similar sources, or to obtain different types of content from the different sources.

In some embodiments, the data processing engine 230 may transmit the processed content from the aggregated content to a repository 235. The repository 235 may be any type of data store which may store and manage data and may be accessed by different entities in the system 200, as necessary and authorized.

In some embodiments, the system may include a narrative generation server 240. In some embodiments, the narrative generation server 240 may be any type of computing device, which may include a laptop, desktop, server, and the like. The narrative generation server 240 may include a narrative generation engine 245.

The narrative generation engine 245 may include computer-readable instructions that in response to execution by the processor(s) 101 cause operations to be performed including obtaining processed content from an aggregation server 230 and/or a repository 235. The narrative generation engine 245 may use the processed content and derived patterns to generate a narrative. The narrative may include content that an author of content has generated and indicated as relevant to an identified topic using metadata, such as flags or the like. Additionally, the narrative may be generated using preferences and parameters associated with the user requesting the narrative (e.g., from a user profile, specified in the request for a narrative, or the like). In some embodiments, the narrative generation engine 245 may obtain a time threshold associated with a user to determine whether to continue creating and/or augmenting a narrative or to finalize the narrative and transmit to the user for consumption. In some embodiments, the narrative generation engine may obtain a second time threshold associated with a user. The second time threshold is a time threshold to be used by the narrative generation engine 245 to augment or update a narrative for a period of time after the narrative has been sent to the user to be consumer, where the narrative is only updated with highly important or relevant updates (e.g., using metadata associated with the content which indicates that the content is of high important or highly relevant content rather than an update with little news or topical value).

The narrative generation engine 245 may communicate with the user device 205 to determine whether to transmit or otherwise provide the narrative to the user once the first time threshold has been met. If the user requests the narrative sooner than specified by the threshold, the narrative generation engine 245 may, depending on the user settings, provide the user with the current narrative or may transmit a message to the user indicating that the narrative is not yet complete and that a more complete narrative will be available shortly. In some embodiments, the narrative generation engine 245 may communicate with the client agent 215 of the user device 205 to reorganize the content on the user device 205 to present the narrative at a time when it is closer to being complete. For example, the client agent 215 may coordinate with an email application to rearrange the order of emails presented to the user to ensure that the email associated with the narrative is presented to a user at later time in the application activity feed, such that the narrative generation engine 245 has sufficient time to generate and process the narrative for consumption by the user. This may result in presenting the user emails in an order that is not chronological.

Figure 3:
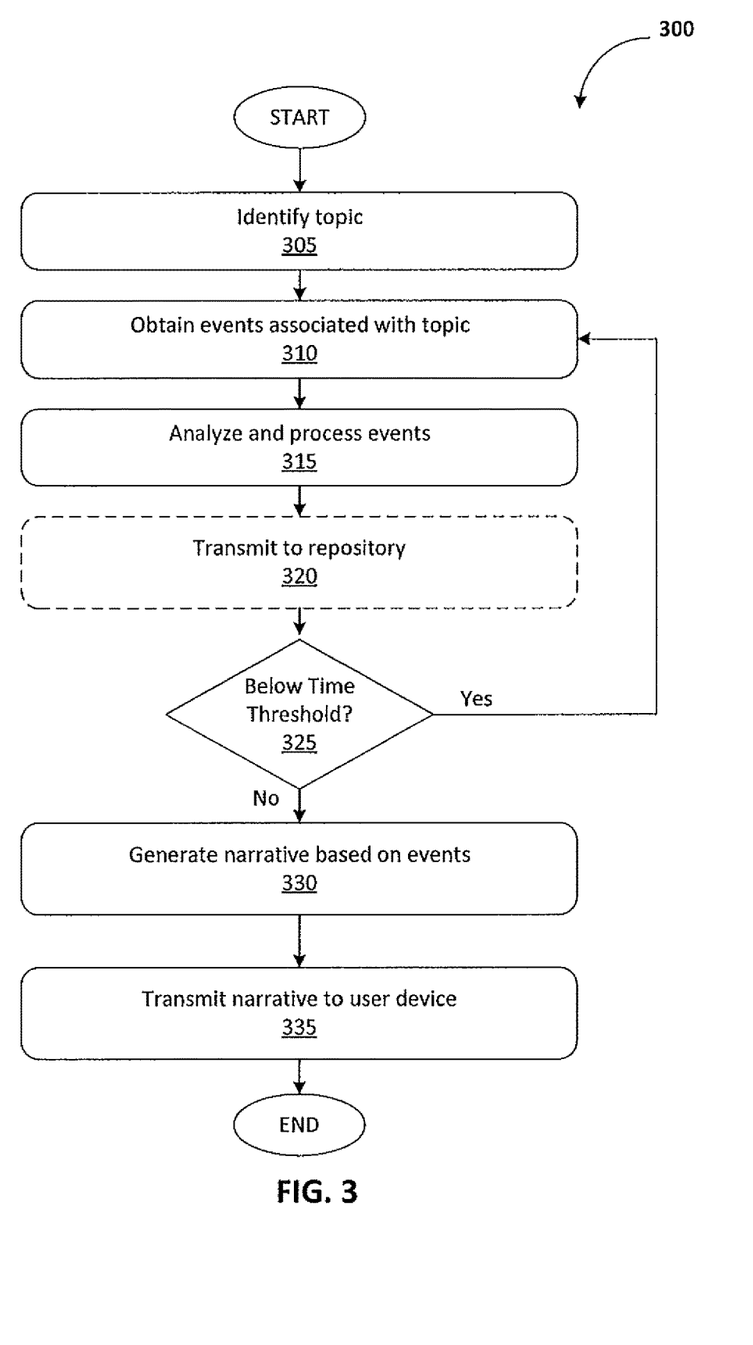
FIG. 3 is a flow diagram of a method for narrative generation using pattern recognition by topic in accordance with an exemplary embodiment.

FIG. 3 is a flow diagram of a method 300 for narrative generation using pattern recognition by topic in accordance with an exemplary embodiment. At block 305, a topic may be identified. In some embodiments, a data management engine 225 may receive an event or content from a user device 205. The data management engine 225 may determine or identify a topic using an identified or received event or content. In some embodiments, the event or content may be an email message, a blog post, a social media post, a website, or text message. In some embodiments, the topic may be specified in the request by a user. In some embodiments, topic suggestions may be generated by the data management engine 225 and presented to the user via the client agent 215, where the user may select one or more topics from the suggested topics.

At block 310, events or content associated with a topic may be obtained. In some embodiments, events or topics associated with the topic may be obtained from one or more sources. The sources may have been selected by the user. In some embodiments, the sources (e.g., websites, social networks, blogs, etc.) may be stored in a profile associated with the user. In some embodiments, the sources may have been included in the request from the user device 205. In some embodiments, the sources may have been selected by an administrator of the system 200. In some embodiments, the sources may be specified in a policy set by the administrator and applicable to a group of users of the system 200. In some embodiments, the sources may be dynamically selected by the data management engine 225. The data management engine 225 may select sources based on previous user behavior, statistics associated with the sources (e.g., high traffic, available content, author of content, etc.). In some embodiments, the data management engine 225 may communicate with the user device 205 to present the selection of sources to the user and to receive confirmation from the user prior to obtaining events and content from the selected sources.

At block 315, the events or content may be analyzed or processed. In some embodiments, the data processing engine 230 may analyze and process to the events or data to remove redundancies. In some embodiments, the data processing engine 230 may normalize the events or content obtained from the different sources. The normalization may utilize timestamps and or natural language processing to identify the most relevant or up-to-date information. Additionally, the data processing engine 230 may analyze the sources and/or authors providing the content or events to determine which information to provide for the narrative (e.g., selecting more established sources, such as a national newspaper over content from a blog). The data processing engine 230 may also process the data to identify or derive any patterns across the different content or events and to aggregate content based on topic, based on a determination of the relationship status of the content or events.

At optional block 320, the events or content may be transmitted to a repository 235. In some embodiments, the events or content and any derived patterns may be transmitted to the repository 235 to be used at a later time.

At block 325, a determination may be made whether a time threshold has been exceeded. In some embodiments, the narrative generation engine 245 may determine whether a time threshold has been exceeded. The narrative generation engine 245 may determine when the initial request for a narrative was made and determine how much time has passed since the request. The narrative generation engine 245 may obtain a time threshold associated with the user (e.g., from the request or a user profile) and compare the time since the request was made to the threshold. The threshold may have been set by the user, an administrator, or dynamically set by the system 200. In some embodiments, the user may have an opportunity to adjust the threshold in real-time (e.g., by clicking on the original event or content to obtain a narrative and requesting the narrative be displayed immediately).

If at block 325, the time threshold has not been exceeded, then the method may proceed back to block 310 to continue obtaining and processing content or events until the threshold has been met or exceeded (e.g., to obtain the most timely information to include the narrative).

If at block 325, the time threshold has been exceeded, then the method may proceed to block 330. At block 330, a narrative may be generated based on the events. In some embodiments, the narrative generation engine 245 may obtain information from the aggregation server 220 and/or the repository 235. The narrative generation engine 245 may generate the narrative of the topic using the obtained events or content. The narrative may be generated using preferences associated with the user.

At block 335, the narrative may be transmitted to the user device 205. The narrative generation engine 245 may communicate the generated narrative to the user device 205 upon reaching the time threshold. In some embodiments, the narrative generation engine 245 may determine a second time threshold is associated with the user. The narrative generation engine 245 may, after the narrative has been transmitted to the user device 205 for consumption, continue monitoring events or content until the second time threshold has been met. If an event or content is marked as highly relevant or important to the topic, the narrative generation engine 245 may update the narrative and may transmit the narrative and notification to the user device 205 that an important update was made to the narrative. After the second threshold has been met, the narrative generation engine 245 may discontinue monitoring events and content and stop providing updates to the narrative.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a data processing engine of an aggregation server, a user selected content from the user via a client agent;
receiving, by the data management engine of the aggregation server, a request from the user via the client agent requesting that a narrative associated with the selected content be generated;
identifying, by the data management engine of the aggregation server, a topic from the content;
obtaining, by the data management engine of the aggregation server, events associated with the topic from one or more sources;
aggregating, by the data management engine of the aggregation server, the events from the one or more sources based on the identified topic;
receiving the aggregated events by a data processing engine of the aggregation server from the data management engine of the aggregation server;
processing, by the data processing engine, the aggregated events to remove duplicate content, wherein processing the aggregated events includes normalizing the aggregated events using timestamps and natural language processing;
starting generation, by a narrative generation engine of a narrative generation server, the narrative of the topic using pattern recognition on the aggregated events;
prior to finalizing the narrative for transmission, obtaining, by the narrative generation engine of the narrative generation server, a first time threshold associated the user that establishes whether the generation of the narrative is to continue or is to be finalized for transmission to the user, and detecting, by the narrative generation engine of the narrative generation server, that the first time threshold has been exceeded;

in response to detecting that the first time threshold has been exceeded, finalizing, by the narrative generation engine of the narrative generation server, the narrative for transmission, and transmitting, by the narrative generation engine of the narrative generation server, the narrative for presentation to the user;

after finalizing and transmitting the narrative, obtaining, by the narrative generation engine of the narrative generation server, a second time threshold associated with the user that establishes whether to update the narrative over a period of time after the narrative has been transmitted to the user, and detecting, by the narrative generation engine of the narrative generation server, that the second time threshold has not been exceeded; and in response to detecting that the second time threshold has not been exceeded, updating, by the narrative generation engine, the transmitted narrative over the period of time.

2. The computer-implemented method of claim 1, further comprising:
retrieving the aggregated events from a repository; and
generating the narrative of the topic using the aggregated events retrieved from the repository.

3. The computer-implemented method of claim 1 further comprising:
receiving an update event associated with the topic, wherein updating the transmitted narrative over the period of time includes updating the narrative using the update event; and
transmitting a notification and the narrative to the user, wherein the notification is indicative that the narrative has been updated.

4. The computer-implemented method of claim 1, wherein the one or more sources were previously selected by the user.

5. The computer-implemented method of claim 1, wherein the content is one of an email, a blog post, a social media post, a website, or text message.

6. The computer program product of claim 1, wherein the one or more sources were previously selected by the user.

7. The computer program product of claim 1, wherein the content is one of an email, a blog post, a social media post, a website, or text message.

8. A computer program product comprising a non-transitory storage medium readable by a computer system and storing instructions for execution by the computer system for performing a method, the system comprising an aggregation server and a narrative generation server, the method comprising:
receiving, by a data processing engine of an aggregation server, a user selected content from the user via a client agent;
receiving, by the data management engine of the aggregation server, a request from the user via the client agent requesting that a narrative associated with the selected content be generated;
identifying, by the data management engine of the aggregation server, a topic from the content;
obtaining, by the data management engine of the aggregation server, events associated with the topic from one or more sources;
aggregating, by the data management engine of the aggregation server, the events from the one or more sources based on the identified topic;
receiving the aggregated events by a data processing engine of the aggregation server from the data management engine of the aggregation server;
processing, by the data processing engine, the aggregated events to remove duplicate content, wherein processing the aggregated events includes normalizing the aggregated events using timestamps and natural language processing;
starting generation, by a narrative generation engine of a narrative generation server, the narrative of the topic using pattern recognition on the aggregated events;
prior to finalizing the narrative for transmission, obtaining, by the narrative generation engine of the narrative generation server, a first time threshold associated the user that establishes whether the generation of the narrative is to continue or is to be finalized for transmission to the user, and detecting, by the narrative generation engine of the narrative generation server, that the first time threshold has been exceeded;
in response to detecting that the first time threshold has been exceeded, finalizing, by the narrative generation engine of the narrative generation server, the narrative for transmission, and transmitting, by the narrative generation engine of the narrative generation server, the narrative for presentation to the user;
after finalizing, and transmitting the narrative, obtaining, by the narrative generation engine of the narrative generation server, a second time threshold associated with the user that establishes whether to update the narrative over a period of time after the narrative has been transmitted to the user, and detecting, by the narrative generation engine of the narrative generation server, that the second time threshold has not been exceeded; and
in response to detecting that the second time threshold has not been exceeded, updating, by the narrative generation engine, the transmitted narrative over the period of time.

9. The computer program product of claim 8, wherein the method further comprises:
retrieving the aggregated events from a repository; and
generating the narrative of the topic using the aggregated events retrieved from the repository.

10. The computer program product of claim 8, further comprising:
receiving an update event associated with the topic, wherein updating the transmitted narrative over the period of time includes updating the narrative using the update event; and
transmitting a notification and the narrative to the user, wherein the notification is indicative that the narrative has been updated.

11. A system, comprising:
a processor;
an aggregation server comprising a data processing engine and a data management engine; and
a narrative generation server comprising a narrative generation engine;
wherein the data management engine of the aggregation server is configured to:
received a user selected content from the user via a client agent;

receive a request from the user via the client agent requesting that a narrative associated with the selected content be generated;
identify a topic from the content;
obtain events associated with the topic from one or more sources; and
aggregate the events from the one or more sources based on the identified topic;
wherein the data processing engine is configured to receive the aggregated events from the data management engine and to process the aggregated events to remove duplicate content, wherein, to process the aggregated events, the data processing engine is further configured to: normalize the aggregated events using timestamps and natural language processing; and
wherein the narrative generation engine is configured to:
start generation of the narrative of the topic using pattern recognition on the aggregated events;
prior to finalizing the narrative for transmission, obtain a first time threshold associated the user that establishes whether the generation of the narrative is to continue or is to be finalized for transmission to the user and then detect that the first time threshold has been exceeded;
in response to detecting that the first time threshold has been exceeded, finalize the narrative for transmission, and then transmit the narrative for presentation to the user;
after finalizing and transmitting the narrative, obtain a second time threshold associated with the user that establishes whether to update the narrative over a period of time after the narrative has been transmitted to the user, and then detect that the second time has not been exceeded; and
in response to detected that the second time threshold has not been exceeded, update the transmitted narrative over the period of time.

12. The system of claim 11, wherein the data processing engine is further configured to retrieve the aggregated events from a repository; and wherein the narrative generation engine is further configured to generate the narrative of the topic using the aggregated events retrieved from the repository.

13. The system of claim 11, wherein the narrative generation engine is further configured to:
receive an update event associated with the topic, wherein, to update the transmitted narrative over the period of time, the narrative generation engine is further configured to update the narrative using the update event; and
transmit a notification and the narrative to the user, wherein the notification is indicative that the narrative has been updated.

14. The system of claim 11, wherein the one or more sources were previously selected by the user.

* * * * *